Dec. 16, 1952 — T. L. H. BUTTERFIELD — 2,622,179
ELECTRIC-ARC WELDING APPARATUS
Filed Feb. 23, 1951 — 3 Sheets-Sheet 1

Inventor
TREVOR L. H. BUTTERFIELD
By *[signature]*
Attorney

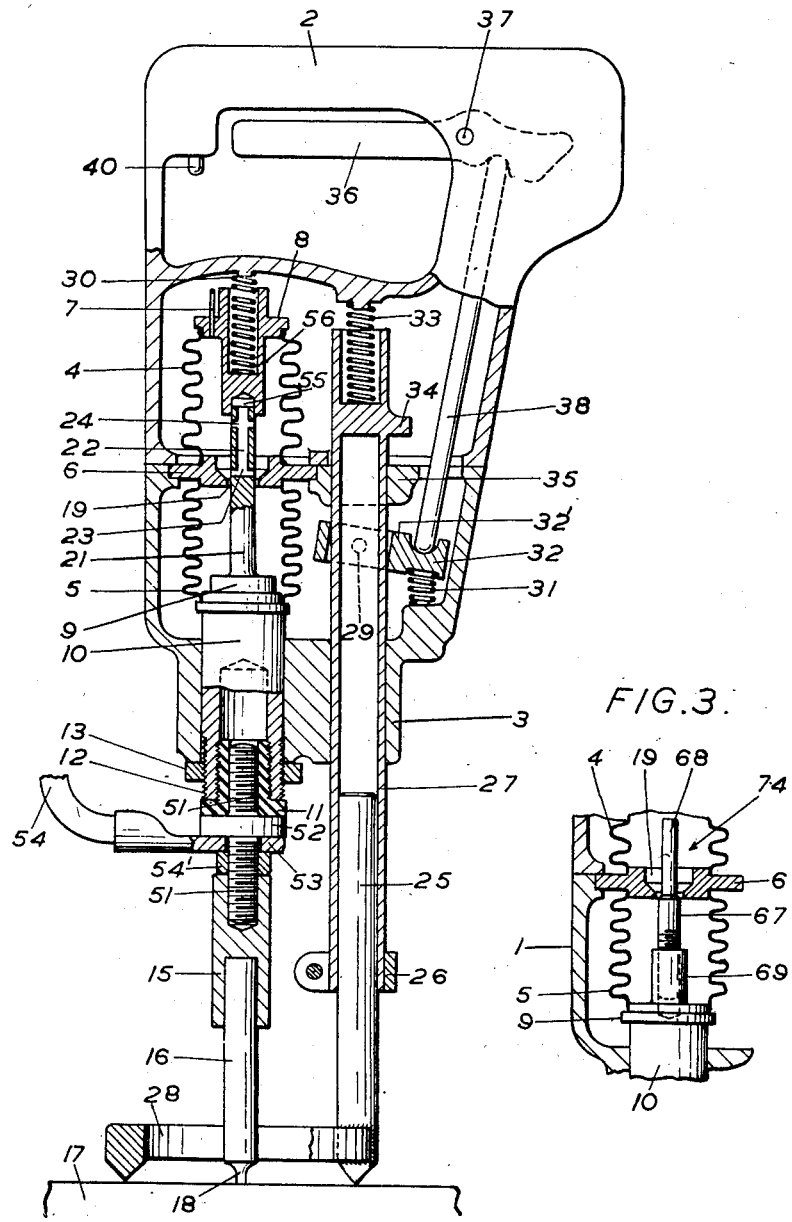

Dec. 16, 1952  T. L. H. BUTTERFIELD  2,622,179
ELECTRIC-ARC WELDING APPARATUS
Filed Feb. 23, 1951  3 Sheets-Sheet 3
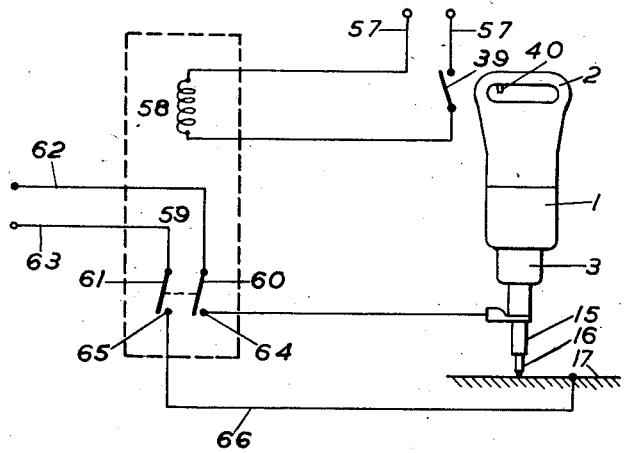
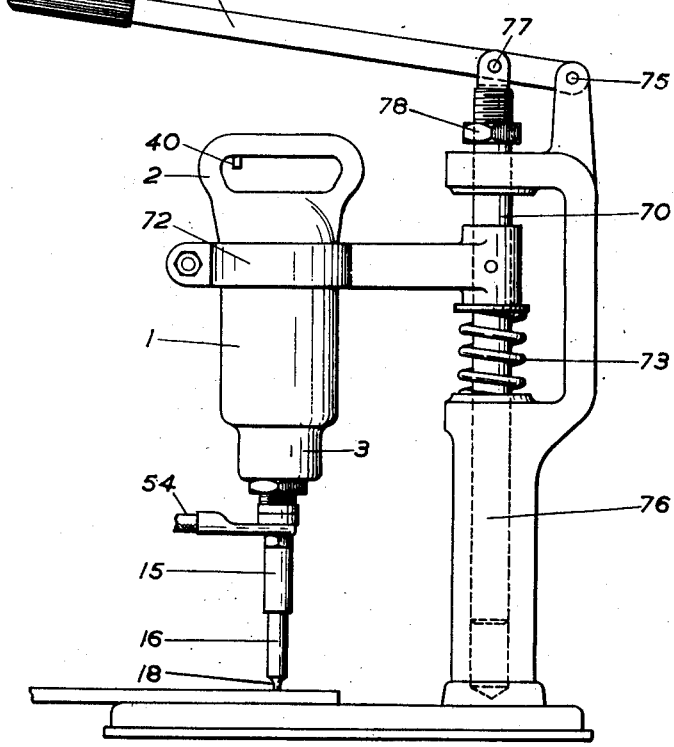
Inventor
TREVOR L. H. BUTTERFIELD Patented Dec. 16, 1952

2,622,179

UNITED STATES PATENT OFFICE 2,622,179

ELECTRIC-ARC WELDING APPARATUS

Trevor Lumsden Herbert Butterfield, Guildford, England, assignor to Bowler & Sidney, Limited, Slough, England, a British company Application February 23, 1951, Serial No. 212,274
In Great Britain March 6, 1950

2 Claims. (Cl. 219—4)

The invention relates to electric-arc welding apparatus and more particularly to apparatus for welding studs or like small articles to workpieces.

When welding studs automatically by the electric-arc process it is necessary to have a welding current supply, such as an electric transformer or generator, or alternatively, a charged condenser connected in circuit with the metal stud, or the like, to be welded, and the plate or other part to which the stud is to be welded, hereinafter referred to as a workpiece.

The stud is held in a hand tool termed a "gun," or alternatively, in a fixed tool, which, on the initiation of the cycle of operation, automatically causes an electric-arc of predetermined duration to be struck between the stud and the workpiece, and at the appropriate moment in the operating cycle thrusts the stud into the molten crater formed in the workpiece, whereupon, after extinction of the arc and subsequent solidification of the crater, the stud becomes welded to the workpiece.

The normal type of stud-welding gun performs this operation by virtue of an electric solenoid incorporated within the gun, but the energising of this solenoid and the sequence of operation is controlled from an external timing unit.

It has previously been suggested to provide one form of such a tool with a spring to effect the thrust, and with a hydraulic damping device connected with a ram controlled by the solenoid to raise the stud off the workpiece in order to strike an arc and also to energise the spring.

The present invention is not concerned with such an action.

An electric arc welding gun or tool according to the invention comprises a body having a reaction device which is mounted on it, so as to form an integral part of the tool, and is operatively connected with a stud chuck spindle so that the reaction device is energised merely by forcible application of the tool to a workpiece, means being provided for regulating the outward movement of the stud chuck spindle under the reaction of the reaction device so that the movement is first slow to ensure correct striking and duration of an arc and fusion of the stud adjacent to the workpiece and is then sudden to drive the stud home into the molten crater formed in the workpiece.

In other words, this regulating or timing means for the reaction device ensures that an adequate dwell is obtained to ensure that the striking of an arc, fusion of the stud adjacent to the workpiece and a crater in the workpiece have all been correctly effected before the stud is thrust into the crater.

The reaction device comprising two spring bellows containing a liquid and having an intercommunicating valve orifice, one bellows being operatively connected with the stud chuck spindle and having a valve for regulating the flow of liquid through the orifice so that after compression of that bellows, due to forcible application of the tool to a workpiece, and discharge of liquid into the other bellows the return of the discharged liquid, on the expansion of the bellows connected with the stud chuck spindle, is regulated to ensure first a slow outward movement of the chuck spindle during the striking of an arc and fusion of the stud adjacent to the workpiece and then a sudden movement to thrust the stud home into the crater formed in the workpiece.

In the accompanying drawings:

Figures 1 and 2 are sectional elevations of one example of welding tool or gun according to the invention, the parts being shown in the normal and operative positions, respectively;

Figure 3 is a sectional elevation of an alternative form of valve;

Figure 4 is a diagram of the electrical connections, and

Figure 5 is a diagrammatic side elevation of a fixed tool.

Figure 1:
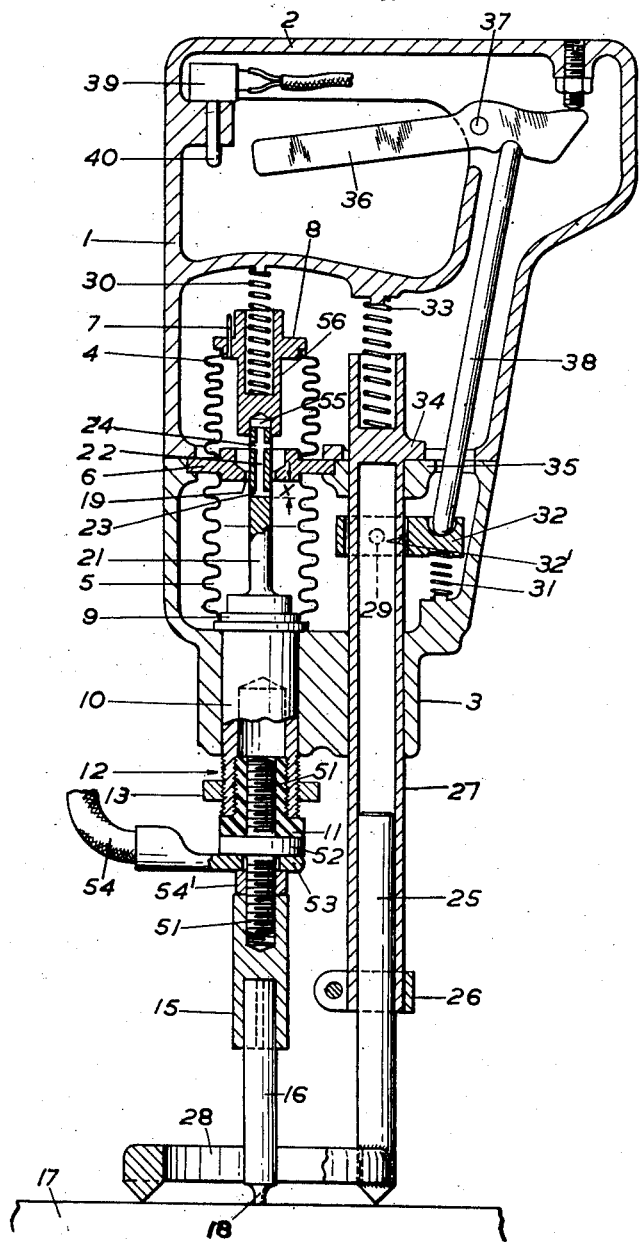

In the example of welding tool or gun illustrated by Figures 1 and 2 of the drawings the body 1 of the tool has a hand grip or butt 2 at its upper end and an extension 3 at its lower end.

The body 1 contains a reaction device comprising two spring bellows 4 and 5 coupled together at their adjacent ends by a disc or partition 6 which is fixed to the body 1 and has a valve orifice 19 forming a communicating passage between the two bellows.

The outer ends of the bellows 4 and 5 are blanked off by metal sealing discs 8 and 9 respectively.

The two bellows 4 and 5 are initially filled through a capillary tube 7 with a fluid of convenient viscosity, which does not vary unduly with variations in temperature.

The tube 7 is then sealed off.

Means for controlling the flow of fluid through the orifice 19 is referred to later on.

The sealing disc 9 is formed on a chuck spindle 10 which slides through the extension 3.

The chuck spindle 10 has a screw thread 12 for an adjustable stop-nut 13 for engagement with the extension 3 for the purpose of limiting the inward sliding movement of the chuck spindle as hereinafter explained.

The chuck spindle 10 is fitted with an insulating ferrule 11 carrying a screw 51 having a collar 52. The contact eye 53 of a lead 54 is clamped against the collar 52 by a nut 54' and the lower part of the screw 51 carries the stud chuck 15.

The chuck 15 holds a stud 16 which is to be welded to a workpiece, indicated diagrammatically by 17. The stud is shown provided with a fusible tip 18.

The portion 21 of the chuck spindle 10 which is inside the bellows 5 constitutes a valve rod which reciprocates in the valve orifice 19, and is of such diameter as to leave but a restricted passage for the flow of liquid therethrough.

The valve rod 21 has a passage 22 having lateral ports 23 and 24. The upper end of the valve rod 21 enters a recess 55 in a boss 56 on the disc 8.

In the normal position of the parts, that is before the tool is forcibly applied to the workpiece the bellows 5 is expanded, as indicated in Figure 1, and the ports 23 and 24 are open so that fluid can flow through them and the passage 22, and also through the valve orifice 19 which is restricted by the valve rod 21.

When the bellows 5 is compressed on the forcible application of the tool to the workpiece, the valve rod 21 moves relatively to the partition 6, into a position such as indicated in Figure 2, in which position the lateral port 23 does not communicate directly with the lower bellows 5.

Consequently when the bellows 5 expands again as hereinafter explained the rate of flow of fluid between the bellows 4 and 5 at first will be slow as fluid can only flow through the valve orifice 19 which is restricted by the valve rod 21.

When the bellows 5 has expanded sufficiently for the valve rod 21 to open the port 23 the movement is rapid.

The bellows 4 and 5 are spring bellows and tend to expand under their own elasticity, but it is preferable to adopt a light construction of bellows and to rely on the tension of a return spring 30 to assist the expansion of the bellows 5 after its initial compression on the forcible application of the tool to the workpiece.

The extension 3 of the body of the tool also forms a guide for a spindle 27 to which the stem 25 of a foot 28 is clamped by a clamp 26.

The foot 28 is intended for engagement with the workpiece 17 when the tool is forcibly applied.

When the foot is so applied, as hereinafter explained, the foot spindle 27 slides in the extension 3 against the action of a return spring 33 its outward movement under the action of the spring 33 being limited by a stop 34 abutting against the adjacent part 35 of the body 1.

A clutch 32 is pivoted at 29 on the body 1 and has a hole 32' which in the normal position of the clutch, as indicated in Figure 1, allows the spindle 27 to slide freely.

The clutch 32 is held in this position by a spring 31.

A hand lever 36 is pivoted at 37 to the body 1 just below the hand grip 2 so that it can be tilted by the operator's fingers when grasping the tool.

A thrust rod 38 extends between the hand lever 36 and the clutch 32 so that when the hand lever 36 is tilted it tilts the clutch 32 against the action of the spring 31 and causes the clutch to bind on the foot spindle 27 and thereby lock the spindle against sliding movement for the purpose referred to later on.

A switch 39 is mounted in the grip 2 and is closed by a push button 40 arranged conveniently adjacent to the hand lever 36 so that the operator after locking the clutch 32 can press the button to close an electric circuit which initiates the supply of welding current to the lead 54.

In the circuit diagram indicated in Figure 4 the initiating switch 39 is shown controlling a supply circuit 57 including the operating coil 58 of a contactor 59 the movable contacts 60, 61 of which are connected with leads 62, 63 from any suitable supply of welding current. One fixed contact 64 is connected by the lead 54 to the chuck 15 and the other 65 by the lead 66 to the workpiece 17.

The operation of the tool above described is as follows:

A stud 16 provided with a fusible tip 18 is inserted in the chuck 15. The stop nut 13 is adjusted to ensure that a sufficient dwell or delay in the opening of the port 23 will occur before the bellows 5 makes its rapid expansion movement, that is so that the port 23 is at a convenient distance $x$, Figure 1 below the partition 6.

The foot 28 is then adjusted by means of the clamp 26 so that the contact points of the foot 28 are approximately level with the tip 18 of the stud 16.

Once these adjustments have been made the tool can be used repeatedly for studs of similar length.

The operator, grasping the grip 2 firmly, then applies the tool forcibly to the workpiece. The body 1 moves down relatively to the chuck spindle 10 and the foot spindle 27, until arrested by the stop nut 13, both of the spindles 10 and 27 at this stage being stationary.

The spring bellows 5 and the springs 30 and 33 are compressed or energised. Liquid is forced from the bellows 5 through the valve orifice 19 and also through the ports 23, 24 and passage 22 until the port 23 is closed.

The bellows 4 is consequently expanded by the liquid forced into it and the spring 30 is compressed. The reaction device constituted by the spring bellows 4 and 5 and spring 30 is thus energised.

When the parts are in this condition the operator tilts the hand lever 36 which, by means of the push rod 38, tilts the clutch 32 which binds on the foot spindle 27.

The body 1 is thus locked on the foot spindle with its reaction device in the energised condition. The operator then presses the button 40 to close the switch 39.

As will be evident from Figure 4 current will pass through the coil 58 of the contactor 59 so that the movable contacts 60, 61 will be moved on to the fixed contacts 64, 65 and a welding current will pass from the supply leads 62, 63 and leads 54, 66 to the stud chuck 15 and workpiece 17.

The tip 18 is fused, and an arc is struck between the now unsupported stud and the workpiece.

As soon as the tip 18 is fused and ceases to support the stud 16, the stud spindle 10 begins to move down relatively to the body 1 which remains stationary being locked with the foot 28 which rests on the workpiece.

Owing to the restriction of the valve orifice 19 by the valve rod 21 the flow of liquid from the bellows 4 to the bellows 5 is small and consequently the first movement of the stud spindle is slow. This allows time for the arc to be properly struck and to fuse the lower end of the stud and also form a molten patch in the workpiece.

When the valve rod 21 descends sufficiently to open the port 23 the movement of the stud chuck spindle 10 and stud is rapidly increased and the stud is suddenly thrust home into the molten patch in the workpiece extinguishing the arc and allowing the stud to become welded to the workpiece. The operator can then release the switch 39 to enable the contactor 59 to cut off the supply of welding current, and release the lever 36 so that the spring 31 returns the clutch 32 to normal position. The operator may then lift the tool from the stud and the spring 33 then restores the foot spindle 27 to its normal position.

In the alternative construction shown in Figure 3 a valve rod 74 comprises two portions 67, 68 of different diameters.

The rod 74 is screwed into a sleeve 69 on the partition 9 to allow for adjustment.

In the normal position and during the initial slow movement of the stud chuck spindle 10 during a welding operation the part 67 of larger diameter restricts the valve orifice 19, but during the following sudden movement the part 68 of smaller diameter is passing through the valve orifice 19 and consequently leaves greater area or clearance for the flow of liquid.

The invention is not restricted to a hand tool as it may be applied to a tool held in a fixture, for example as somewhat diagrammatically indicated in Figure 5, a tool such as shown in Figures 1 and 2 but without a foot is secured by a clamp 72 to a spindle 70 capable of being moved down by a handle 71 against the action of a spring 73.

The handle 71 is pivoted at 75 to a standard 76 and the spindle 70 is pivotally connected to the handle 71 at 77. A stop nut 78 is provided on the spindle to limit the downward movement of the spindle.

I claim:

1. An electric arc welding tool for welding studs and like small articles to work pieces, comprising a body, a stud chuck spindle, a reaction device mounted on the body, said reaction device comprising two axially aligned and sealed upper and lower spring bellows containing a fluid, a fixed partition between the two bellows, said partition having a valve orifice and a return spring between said body and the upper bellows, the stud chuck spindle being permanently fixed to the lower bellows with its upper end contained within said lower bellows and passing through the orifice in the partition into the upper bellows to enable said reaction device and said return spring to be energised by forcible application of the tool to the workpiece, said upper end of the stud chuck spindle being formed as a valve to regulate, subsequent to the energisation of the reaction device and return spring, the flow of fluid through the orifice in the partition, for the purpose of first retarding the movement of the stud chuck spindle during fusion of the stud adjacent to the workpiece and the formation of a molten crater in the workpiece and then permitting of rapid movement of the stud chuck spindle to drive the stud into said molten crater, both the slow and rapid movements being effected uninterruptedly by and under control of the energised reaction device and the same energised return spring, and being initiated by the flow of welding current.

2. An electric arc welding tool as specified in the preceding claim provided with a foot for engagement with the workpiece when the tool is forcibly applied thereto, a stem on said foot, a spindle to which said stem is adjustably attached, said spindle being slidably mounted in the tool body, a return spring for said spindle, a clutch on said spindle, said clutch allowing the spindle to slide in the tool body in setting the tool in relation to the workpiece and to load the return spring, and a clutch lever for operating the clutch to hold the foot spindle against sliding movement in the tool body during the welding operation and to release the clutch on completion of the welding operation.

TREVOR LUMSDEN HERBERT
BUTTERFIELD.

REFERENCES CITED

The following references are of record in the file of this patent:

UNITED STATES PATENTS

| Number | Name | Date |
|---|---|---|
| 2,416,915 | Evans | Mar. 4, 1947 |
| 2,474,531 | Kier et al. | June 28, 1949 |

FOREIGN PATENTS

| Number | Country | Date |
|---|---|---|
| 542,025 | Great Britain | Dec. 23, 1941 |